UNITED STATES PATENT OFFICE.

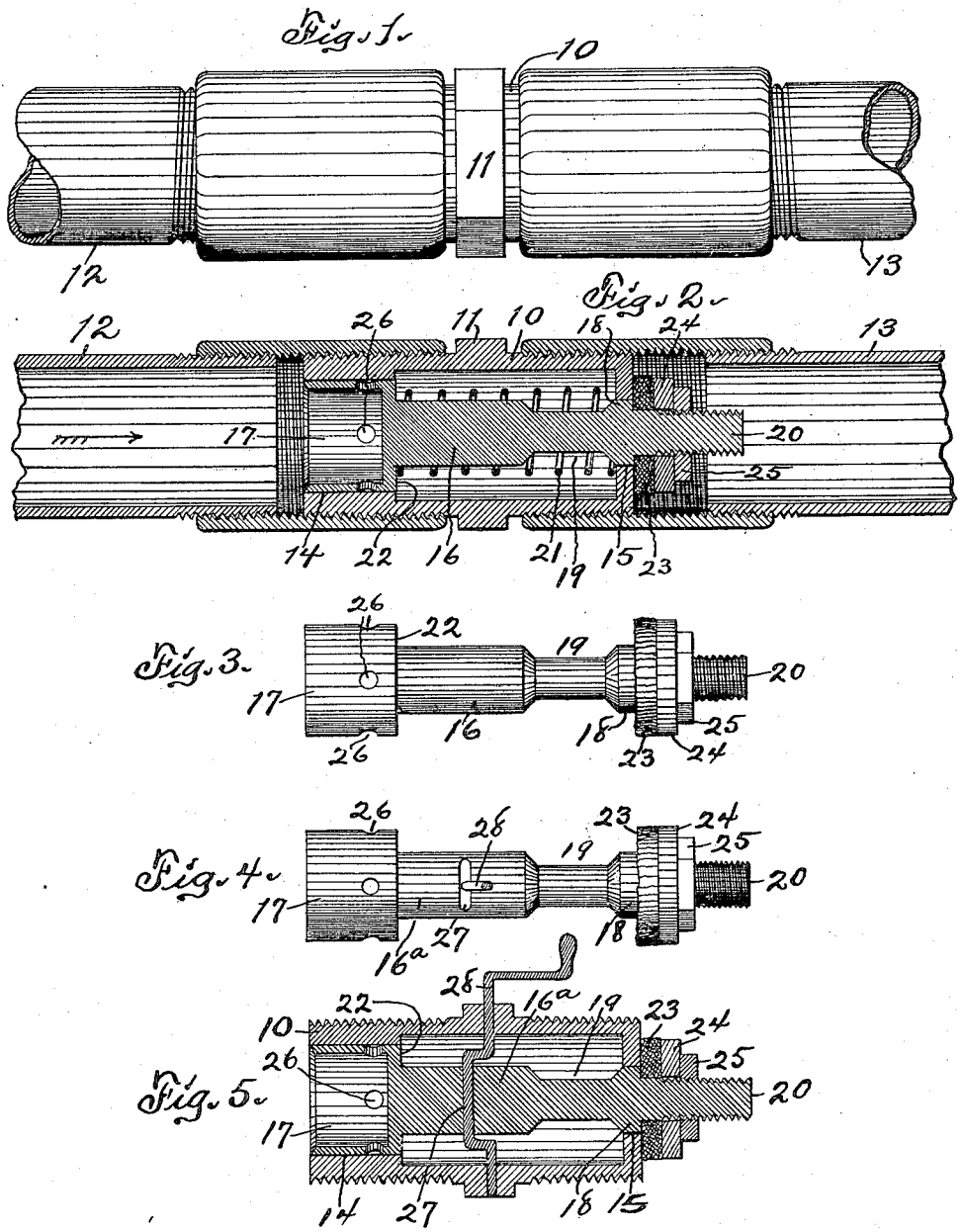

JOSEPH A. KEAN, DECEASED, LATE OF DES MOINES, IOWA, BY IDA KEAN, ADMINISTRATRIX, OF DES MOINES, IOWA.

VALVE.

1,228,565.  Specification of Letters Patent.  Patented June 5, 1917.

Application filed November 15, 1916. Serial No. 131,580.

*To all whom it may concern:*

Be it known that I, IDA KEAN, administratrix of JOSEPH A. KEAN, late a citizen of the United States of America, deceased, myself a citizen of the United States of America, and resident of Des Moines, Polk county, Iowa, submit that JOSEPH A. KEAN did invent a new and useful Valve, of which the following is a specification.

The object of this invention is to provide an improved construction for valves.

My invention consists in the construction, arrangement and combination of elements hereinafter set forth, pointed out in my claims and illustrated by the accompanying drawing, in which—

Figure 1 is a side view showing my improved valve mounted as required for practical use. Fig. 2 is a central longitudinal section of the same. Fig. 3 is a side view of the valve plug removed from its chamber.

Fig. 4 is a side view of a modified form of valve plug removed from its chamber. Fig. 5 is a longitudinal central section of the modified form of plug mounted in its chamber as required for practical use.

In the construction of the device as shown the numeral 10 designates a valve casing, which preferably is made angular to form a nut 11 peripherally of its central portion and externally threaded on opposite sides of said nut to adapt it to be coupled to pipes 12, 13 of a distributing system carrying any desired fluid or liquid in one direction. One end portion of the casing 10 is formed with a central bore 14 of less diameter than the interior of the casing and the opposite end thereof is formed with a central bore 15 of less diameter than the bore 14. A valve plug 16 is formed with a tubular or recessed head 17 slidable in the bore 14 and a barrel 18 slidable in and adapted to be moved to the outside of the bore 15. The valve plug 16 also is formed with a circumferential groove 19 adjacent to the barrel 18 and with a stem 20 on the opposite side of said barrel from said groove, which stem lies wholly outside of the casing 10 and is threaded externally. An expansive coil spring 21 is mounted loosely on the valve plug 16 within the casing 10, which spring impinges at one end on a shoulder 22 forming the inner end of the head 17 and impinges at the opposite end on the inner face of the end of the casing containing the bore 15. A washer 23, preferably made of fibrous material such as felt or leather, is mounted on the stem 20 and is held in contact with the outermost end face of the barrel 18 by means of a metal washer 24 and a nut 25 also mounted on said stem. The washer 23 is adapted to engage the adjacent end face of the casing 10 around the bore 15 when the valve is closed, as shown, and to prevent return of fluid through the bore. The head 17 is formed with lateral ports 26, in any desired number, affording communication from the cavity or recess of said head to the periphery thereof or bore 14.

When this device is employed as a check valve, as shown in Figs. 1 and 2, the flow of fluid is in the direction of the arrow in Fig. 2. Pressure of the fluid overcomes the spring 21 and moves the plug and parts carried thereby so that the ports 26 register with the interior of the casing 10, the barrel 18 moves out of the bore 15, the washer 23 is unseated from the end of the casing 10, and the groove 19 registers with the bore 15, whereupon fluid passes through the cavity of the head 17, through the ports 26, through the interior of the casing 10, through the bore 15 and groove 19 and thence into the pipe 13. When fluid pressure is relaxed sufficiently, the spring 21 moves the plug in the reverse direction and causes the ports to be stopped by the bore 14, the barrel 18 to stop the bore 15 and the washer 23 to seal said bore 15. This done, back pressure of fluid, if any there be, on the washers, nut and stem, assists the spring in holding the plug in closed position and prevents reflow of the fluid.

In the construction of the device as shown in Figs. 4 and 5, a diametrical slot 27 is formed in the plug 16ᵃ and a crank lever 28 is pivoted in and transversely of the nut 11, the crank of said lever extending through said slot. The spring 21 is omitted from this construction.

In practical use of this device the valve is opened and closed by manual rotation of the crank lever 28.

I claim:—

1. A valve comprising a casing formed with alining bores in its ends of less diameter than the interior thereof, a plug mounted for rectilinear reciprocation in said casing, said plug being formed with a recessed head slidable in one of said bores and a barrel slidable in the other bore, said recessed head forming a shoulder at its inner end and being formed with lateral ports adapted to open, in one position of the plug, to the interior of the casing, said plug being removable through one end only of said casing, a shoulder being formed by a reduced extremity of said barrel, a washer on said reduced portion of the barrel engaging said latter shoulder and also adapted to engage the outer face of the adjacent end of the casing, a thread being formed on said reduced portion of the barrel, a nut mounted on said thread to retain said washer, said plug being formed with a circumferential groove adjacent said barrel, and an expansive coil spring mounted on said plug within the casing, one end of said spring impinging the first said shoulder, the opposite end of said spring impinging the inner face of the opposite end of said casing.

2. A valve comprising a casing formed with alining end bores of different diameters, said end bores each being of less diameter than the interior of the casing, a plug movably mounted in and projecting at one end from said casing, said plug being formed with a recessed head slidable in one of said end bores and constituting the largest diameter of said plug and forming a shoulder surrounding said plug, the plug also being formed with a barrel slidable in the smaller end bore, the end portion on the plug adjacent the barrel being reduced to form a shoulder at the outer end of said barrel, a fibrous washer mounted on said reduced end portion of the plug and adapted to engage said shoulder adjacent thereto and also adapted to engage the outer face of the adjacent end of the casing, means for securing said washer to the plug, said plug being formed with a circumferential groove within the casing of greater length than the smaller end bore, and an expansive coil spring on said plug within said casing and impinging at opposite ends on the first shoulder and the inner face of the opposite end of the casing respectively, the recessed head being formed with radial ports adapted to register with the interior of the casing at times.

3. A valve plug formed with a recessed head having lateral ports, a shoulder being formed at the juncture of the body and head of the plug, which shoulder is of the diameter of the head, a barrel being formed on the plug opposite to the head, a circumferential groove being formed in the plug between the barrel and head, the barrel being of less diameter than the head, a reduced stem being formed on the barrel and partly threaded, a washer being mounted on the stem and abutting the barrel, a retaining washer being mounted on the stem and abutting the first washer, a nut being mounted on the stem and abutting the retaining washer, and an integral casing formed with end ports adapted to receive said plug, the recessed head slidable in one of said ports and the barrel slidable in the other of said ports, the first washer abutting one end and on the outside of said casing.

Signed by me at Des Moines, Iowa, this 25" day of October, 1916.

IDA KEAN,
*Administratrix of the estate of Joseph A. Kean, deceased.*

Copies of this patent may be obtained for five cents each, by addressing the "Commissioner of Patents, Washington, D. C."